United States Patent [19]
Anderson et al.

[11] Patent Number: 6,148,198
[45] Date of Patent: Nov. 14, 2000

[54] METHOD AND APPARATUS FOR SELECTING A SERVICE PROVIDER

[75] Inventors: Keith Anderson, Durham; David Hoover, Cary, both of N.C.

[73] Assignee: Ericsson Inc., Research Triangle Park, N.C.

[21] Appl. No.: 09/129,317

[22] Filed: Aug. 5, 1998

[51] Int. Cl.[7] .................................................. H04Q 7/20
[52] U.S. Cl. ....................... 455/432; 455/525; 455/434
[58] Field of Search ............................. 455/434, 432, 455/414, 443, 515, 524, 525, 421

[56] References Cited

U.S. PATENT DOCUMENTS

| | | | |
|---|---|---|---|
| 5,790,952 | 8/1998 | Seazholtz | 455/432 |
| 5,884,182 | 3/1999 | Hoover | 455/455 |
| 5,950,130 | 9/1999 | Coursey | 455/432 |

FOREIGN PATENT DOCUMENTS

| | | | |
|---|---|---|---|
| 0779753 A2 | 6/1997 | European Pat. Off. | |
| 836340 | 4/1998 | European Pat. Off. | H04Q 7/22 |
| WO 97/36443 | 10/1997 | WIPO | |
| WO 99/10001 | 1/1999 | WIPO | H04Q 7/32 |

OTHER PUBLICATIONS

International Search Report, PCT, Nov. 18, 1999.

*Primary Examiner*—Edward F. Urban
*Assistant Examiner*—Tilahun Gesesse
*Attorney, Agent, or Firm*—Jenkens & Gilchrist, P.C.

[57] ABSTRACT

A mobile station and an intelligent roaming method for selecting a best service provider from a plurality of service providers. The mobile station includes a database for storing a plurality of identifier codes that correspond with the plurality of service providers. The database also has an overlap flag added to each of the stored identifier codes. The mobile station uses the intelligent roaming procedure to locate a first channel and a second channel broadcast by the service providers, where each channel contains one of the stored identifier codes and at least one of the located and stored identifier codes has an overlap flag that is set. The intelligent roaming procedure evaluates channel information associated with the first channel and channel information associated with the second channel to select a best channel for supporting a call. Thereafter, the mobile station selects the best service provider by utilizing the selected channel.

24 Claims, 5 Drawing Sheets

METHOD AND APPARATUS FOR SELECTING A SERVICE PROVIDER

BACKGROUND OF THE INVENTION

1. Technical Field of the Invention

The present invention relates to a cellular communications system and, in particular, to a cellular communications system having an intelligent roaming procedure for enabling a mobile station to select a best service provider from a plurality of service providers.

2. Description of Related Art

People that subscribe to a cellular telephone service do so primarily because of the provided mobility advantage. With a cellular telephone subscription, a subscriber is freed from fixed wireline connections, and may move about a home service area covered by a home service provider to make and receive telephone calls on a mobile station. Recently the subscriber has had an increasing number of opportunities to use the mobile station not only in the home service area, but also when traveling within geographic areas where cellular telephone services are provided through other service providers. The subscriber is referred to as a "roamer" when they use service providers other than their home service provider.

To facilitate the provision of cellular telephone service to roamers, cellular service providers enter into billing and other reciprocity service agreements to allow the subscriber to move among and between visited service areas without interrupting their cellular telephone service. The billing rates and other reciprocity agreements usually differ between the home service provider and the other service providers.

Of course, the subscriber would prefer to utilize the service provider that has negotiated the best available rates with their home service provider, provided the home service provider is not presently available for use by the subscriber. To aid in this selection process, the subscriber currently uses a mobile station having an intelligent roaming procedure which attempts to locate the service provider offering the best service and generally the least expensive services to the subscriber.

Unfortunately, the current intelligent roaming procedure may have difficulty in determining the best service provider especially when the mobile station is located on or near an edge of a service area or coverage area of one of the service providers. The coverage areas of multiple service providers may be contiguous to each other when the service operators utilize the same band or frequency, while the coverage areas may overlap one another when service providers utilize different bands. Thus, when the mobile station is located on or near the edge of one of the coverage areas there may be multiple service providers available for use by the subscriber. The current intelligent roaming procedure may have difficulty in selecting the best service provider from the multiple of service providers that are available, because of an assumption made during the current procedure.

Mobile stations utilizing the current intelligent roaming procedure to receive and analyze channels transmitted by service providers assume that all of the channels transmitted in a given band belong to the same service provider. The assumption is problematic, because when the mobile station receives and analyzes one channel it may not continue to analyze other channels transmitted in the same band that are associated with other service providers that offer better rates to the subscriber. Therefore, the assumption made by the current intelligent roaming procedure may prevent the mobile station from selecting the best service provider especially when the mobile station is located on or near the edge of a coverage area.

Moreover, when the mobile station is located on or near the edge of the coverage area associated with their home service provider it is possible using the current intelligent roaming procedure that the mobile station will select one of the other service providers instead of their home service provider, because the other service providers also transmit channels in the same band used by the home service provider.

Accordingly, there is a need for an intelligent roaming method and system for enabling a mobile station to select a best service provider from a plurality of service providers. There is also a requirement to provide an intelligent roaming method and system that does not automatically assume all channels transmitted in a given band are associated with the same service provider. These and other needs are addressed by the intelligent roaming method and system of the present invention.

SUMMARY OF THE INVENTION

The present invention is a system and an intelligent roaming method for enabling a mobile station to select a best service provider from a plurality of service providers. The mobile station includes a database for storing a plurality of identifier codes that correspond with the plurality of service providers. The intelligent roaming method includes adding an overlap flag to each of the stored identifier codes, and broadcasting a first channel and a second channel from different service providers. The mobile station using the intelligent roaming procedure then locates the first channel and the second channels, where each channel contains one of the stored identifier codes and at least one of the located and stored identifier codes has an overlap flag that is set. The intelligent roaming procedure evaluates channel information associated with the first channel and channel information associated with the second channel to select a best channel. Thereafter, the mobile station and intelligent roaming procedure selects the best service provider by utilizing the channel information associated with the best channel.

In accordance with the present invention there is provided a system and method where mobile stations located at the edges of coverage areas can selectively search for channels to camp-on even though they are intermixed with other channels.

Further in accordance with the present invention there is provided a system and method where the mobile station has the ability to find multiple channels at edges of coverage areas associated with multiple service providers while also quickly scanning a band when the mobile station is not located near an edge of the coverage area.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Although a wireless telecommunications system 10 offering Personal Communication Services (PCS) based on IS-136A will be discussed, those skilled in the art will appreciate that such application is only one of many utilizing the principles of the present invention. Accordingly, the wireless telecommunications system 10 described should not be construed in a limited manner.

In order to better present and describe the preferred embodiment of the present invention a detailed description of an improved intelligent roaming procedure 100 will be deferred pending a discussion on the components of the wireless telecommunications system 10.

Figure 1:
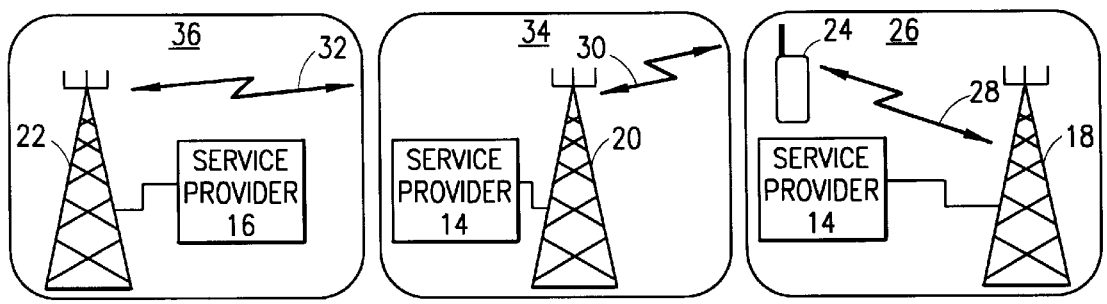
FIG. 1 is a simplified schematic diagram of a wireless telecommunications system.

Referring to FIG. 1, there is illustrated a simplified schematic diagram of the wireless telecommunications system 10. The wireless telecommunications system 10 often includes multiple service providers but for purposes of this discussion a first service provider 12, a second service provider 14 and a third service provider 16 are described. The service providers 12, 14 and 16 can be, for example, Public Land Mobile Networks (PLMN) based on the Digital Advanced Mobile Phone System (DAmps) standard which enables the sending and receiving of circuit switched traffic, or sending and receiving of packet switched traffic.

For clarity, the service providers 12, 14 and 16 respectively having only base stations 18, 20 and 22 are shown, but it should be understood that service providers can also include other mobile network components, such as, one or more mobile services switching centers, home location registers or visitor location registers.

The service providers 12, 14 and 16 are generally classified into one of five categories that include: (1) a home service provider; (2) a partner service provider; (3) a favored service provider; (4) a forbidden service provider; and (5) a neutral service provider. The home service provider is one that the subscriber has purchased their service from, and the partner service provider is one that has negotiated a special rate with the home service provider. The favored service provider is similar to the partner service provider except that a coverage area of the favored service provider overlaps a coverage area of the home service provider. The forbidden service provider is not accessible except to place emergency calls. And, the neutral service provider is one that fails to belong to any of the previous classifications.

A mobile station 24 currently located in a first coverage area 26 associated with the first service provider 12 utilizes the intelligent roaming procedure 100 (FIG. 3) to determine the particular classifications of the service providers 12, 14 and 16. The mobile station 24 determines the particular classification of the service providers 12, 14, and 16 by using System Identities (SIDs) or System Operator Codes (SOCs) respectively transmitted on channels 28, 30 and 32 from the base stations 18, 20 and 22. After determining the particular classification of the service providers 12, 14 and 16, the mobile station 24 utilizes the intelligent roaming procedure 100 (described later) to select a best service provider based on a hierarchy of the classified service providers.

There is a possibility that the mobile station 24 located in the first coverage area 26 will not receive the third channel 32 transmitted from the third service provider 16, because the signal strength associated with the third channel could be too low.

The channels 28, 30 and 32 each have one send frequency and one receive frequency that may be used by the mobile station 24. Furthermore, each of the channels 28, 30 and 32 may be divided into either digital control channels (DCCH) or analog control channels (ACC) which are dedicated to the control of the mobile station 24. There are also traffic channels associated with the channels 28, 30 and 32 that are used for voice and data communication.

The channels 28, 30 and 32 are each transmitted in one of eight bands depending on a particular frequency used by the service providers 12, 14, and 16. In the Personal Communication System (PCS) there are two service bands in the 800 MHZ spectrum and another six service bands in the 1900 MHZ spectrum, while each of the eight bands are further divided into sub-bands which generally transmit or receive eighty-three channels. As illustrated in FIG. 1, the first and second service providers 12 and 14 respectively operate in areas known as the first coverage area 26 and a second coverage area 34. The third service provider 16 operates in a third coverage area 36. The first and second coverage areas 26 and 34 may butt-up against or be contiguous with one another if the first and second service providers 12 and 14 operate in the same band. Otherwise, the first and second coverage areas 26 and 34 may overlap one another if the service providers 12 and 14 operate in different bands (not shown). For purposes of this discussion, the service providers 12, 14 and 16 all operate in the same band which may indicate that some or all of the coverage areas 26, 34, and 36 are contiguous to one another.

Figure 2:
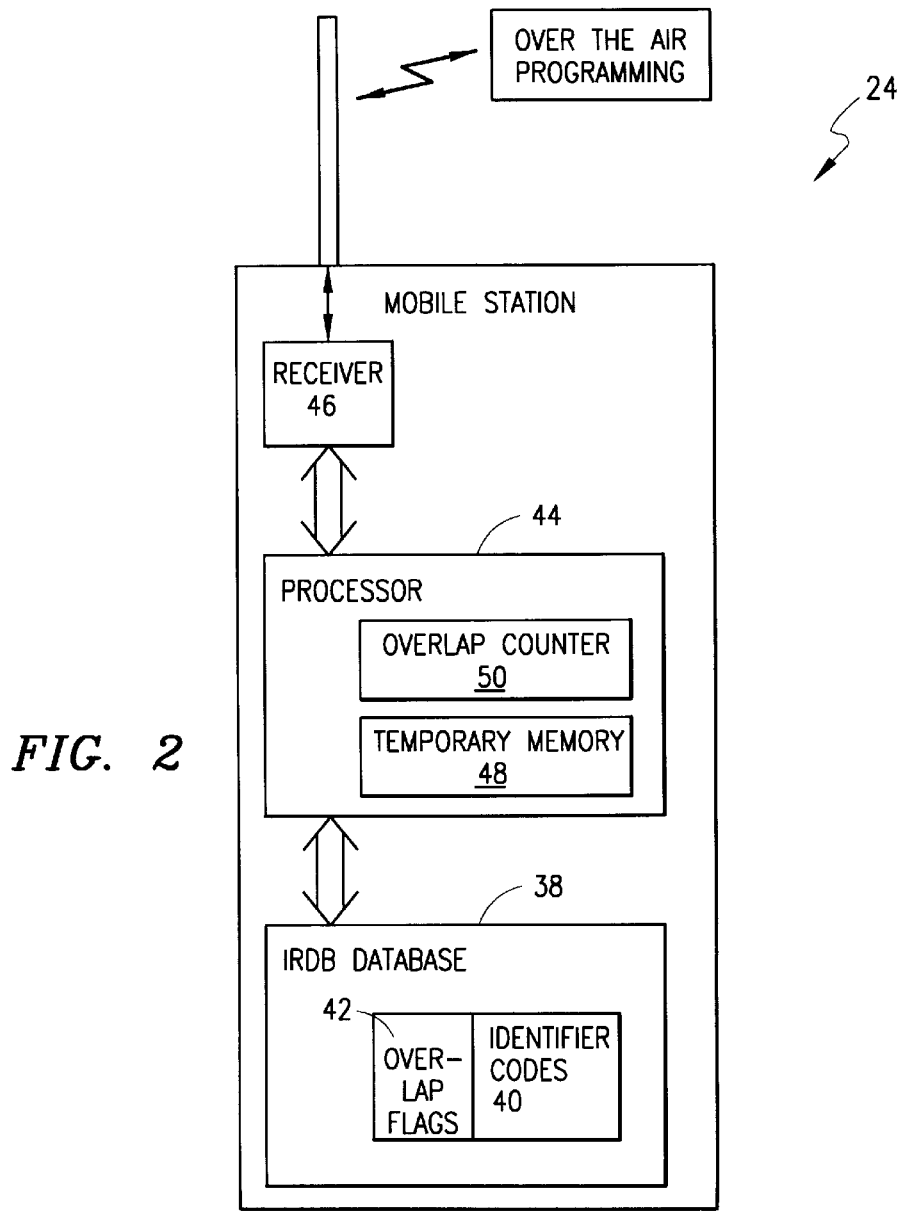
FIG. 2 is a block diagram of a mobile station configured to utilize an intelligent roaming procedure of the present invention.

Referring to FIG. 2, there is illustrated a block diagram of the mobile station 24. The mobile station 24 includes an intelligent roaming database (IRDB) 38 for storing identifier codes 40 generally known as System Identifications (SIDs) and System Operator Codes (SOCs). The stored identifier codes 40 may correspond and will be compared to the SIDs or SOCs transmitted by the service providers 12, 14 and 16 on channels 28, 30 and 32. Each of the stored identifier codes 40 includes an overlap flag 42 which is either set or not set. The overlap flag 42 would be set, for example, if the first and second service providers 12 and 14 operate within the same band and have coverage areas 26 and 34 that are contiguous with one another.

The overlap flag 42 may not be set with reference to the third service provider 16 while the mobile station 24 is located in the first coverage area 26. However, the overlap flag 42 associated with the third service provider 16 may be set if the mobile station 24 were to roam into the second coverage area 34, because the second and third coverage areas 34 and 36 are then contiguous to one another. The status of a multiple number of the overlap flags 42 may be dynamically set or not set by the home service provider (e.g., first service provider 12) by a process known as Over the Air Programming.

Generally, there are multiple service providers 12, 14 and 16 available for use by the mobile station 24 when the mobile station is located on or near an edge of one of the coverage areas 26, 34 and 36. To aid in selecting the best service provider based on the particular classification of the service providers 12, 14 and 16, the mobile station 24 includes a processor 44 for comparing the stored identification codes 40 with the SIDs or SOCs transmitted by each service provider 12, 14 and 16 and received by a receiver 46 of the mobile station. The processor 44 selects the best service provider from the service providers 12, 14 and 16 by utilizing the improved intelligent roaming procedure 100. In other words, the processor 44 in selecting the best service provider utilizes the overlap flag 42 to indicate whether or not a less desirable coverage area overlaps a more desirable coverage area.

Figure 3:
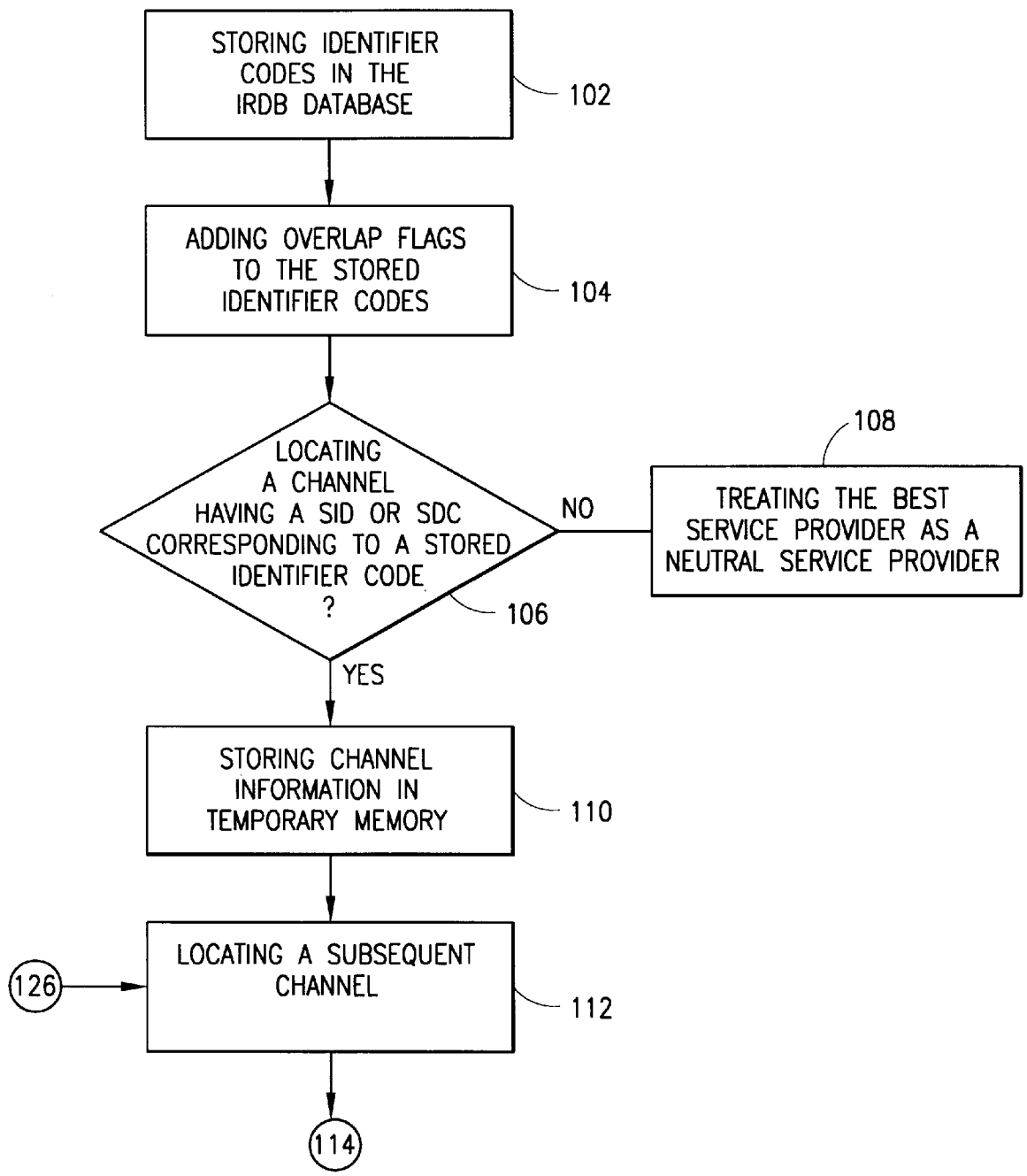
FIG. 3 is a simplified flow diagram of the intelligent roaming procedure.
Figure 3:
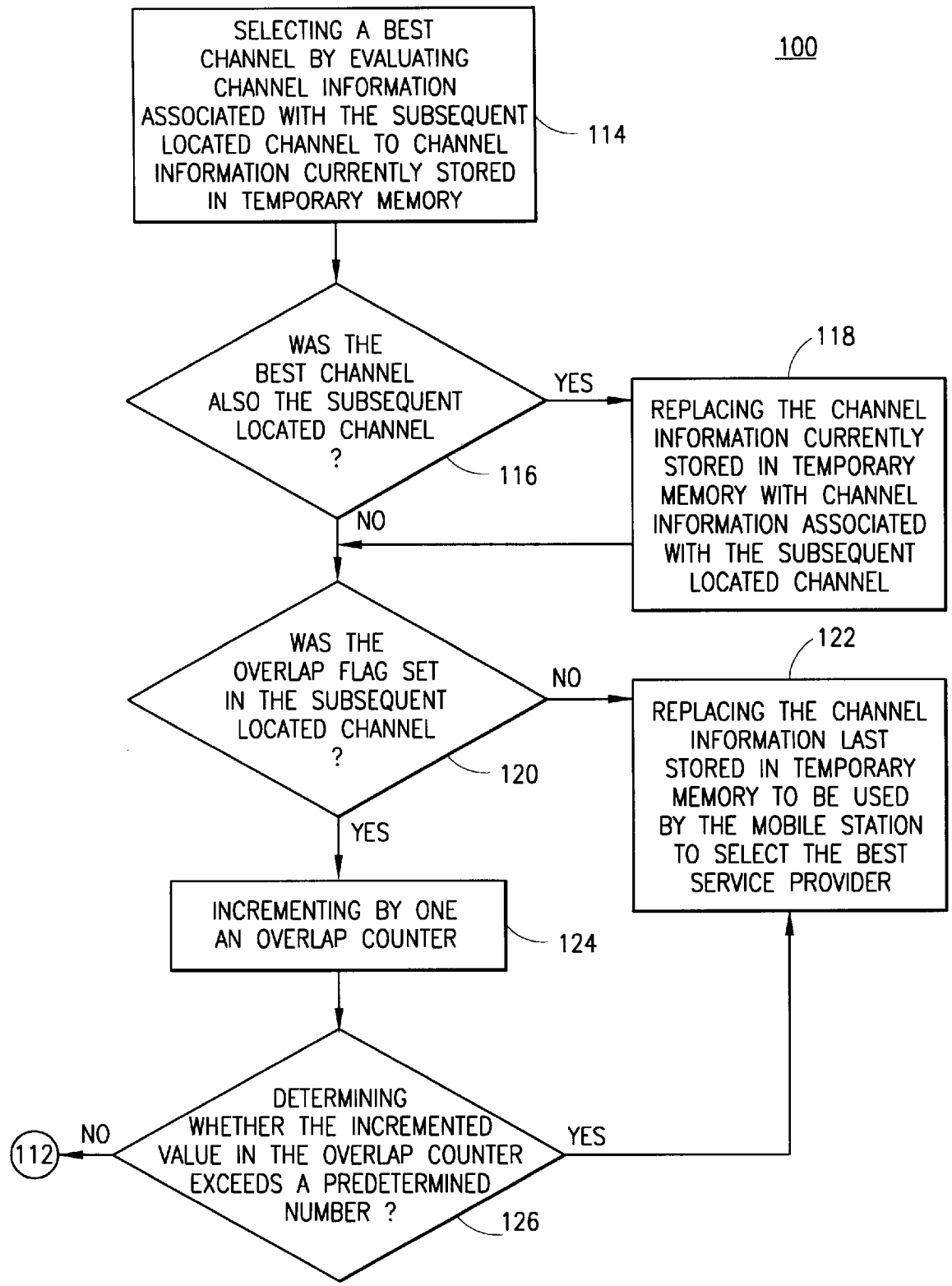

Referring to FIG. 3, there is illustrated a simplified flow diagram of the improved intelligent roaming procedure 100. The intelligent roaming procedure 100 is generally conducted with reference to one or more of the sub-bands of a particular band as discussed below, however, the procedure may be expanded to include other bands.

Beginning at stage 102 of the intelligent roaming procedure 100, a plurality of the identifier codes 40 are stored in the IRDB 38 located in the mobile station 24. The identifier codes 40 as mentioned-earlier may correspond to the SIDs and SOCs transmitted by the service providers 12, 14 and 16 and other service providers (not shown).

At stage 104, the overlap flags 42 are added to each of the stored identifier codes 40. The overlap flags 42 may be set or not set depending on the location of the mobile station 24 by using Over the Air Programming. Also, an overlap counter 50 located in the mobile station 24 is set to zero.

At stage 106, the mobile station 24 locates one of the channels 28, 30 and 32 having a SID or SOC that corresponds to one of the stored identifier codes 40 which also has a set overlap flag 42.

Figure 4:
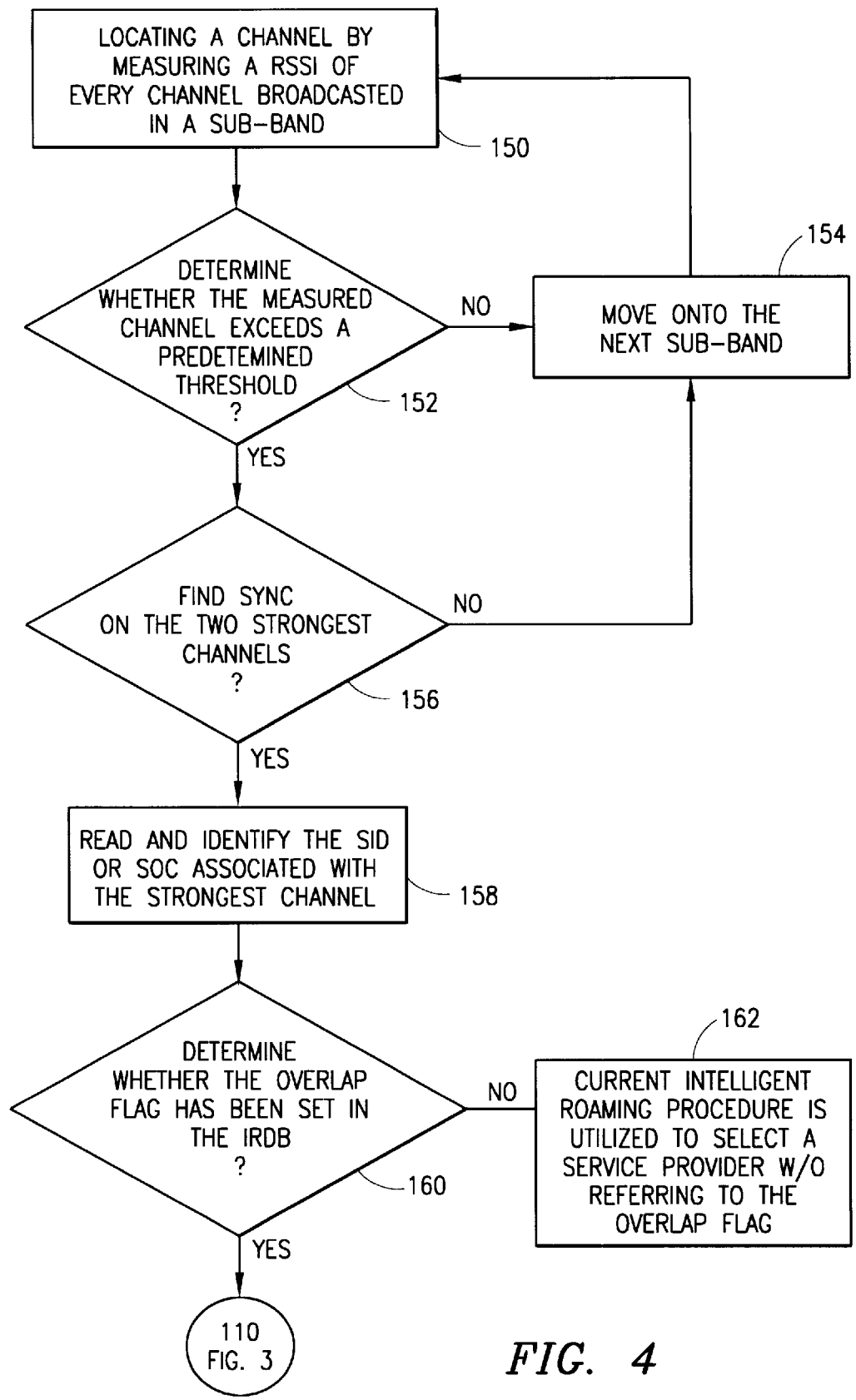
FIG. 4 is a simplified flow diagram of a step of locating a channel associated with stage 106 of FIG. 3.

Referring to FIG. 4, there is illustrated a simplified flow diagram of the step of locating a channel associated with stage 106 of FIG. 3. In performing stage 150, the mobile station 24 locates one of the channels 28, 30 and 32 by measuring a received signal strength (RSSI) of every channel broadcasted in one of the sub-bands.

At stage 152, the mobile station 24 determines whether the measured RSSI exceeds a predetermined magnitude. If no, the mobile station 24 will move onto the next sub-band at stage 154 and repeat the step of measuring a RSSI (stage 150). Otherwise at stage 156, the mobile station 24 attempts to find sync on the two strongest channels. If the mobile station 24 is not able to find sync then the mobile station will move onto the next sub-band (stage 154) and repeat the step of measuring a RSSI (stages 150). And, if sync is found then the mobile station 24 reads and identifies the SID or SOC associated with a strongest channel at stage 158.

At stage 160, the processor 44 in the mobile station 24 upon evaluating the located channel determines whether or not the corresponding overlap flag 42 has been set in the IRDB 38. If the overlap flag 42 has been set then intelligent roaming procedure 100 returns to stage 110 (FIG. 3). Otherwise at stage 162, the current intelligent roaming procedure is utilized by the mobile station 24.

In performing the current intelligent roaming procedure at stage 162, the mobile station 24 determines the particular classification of one of the service providers 12, 14 or 16 based on one of the channels 28, 30 or 32 that has been read and identified without referring to the overlap flag 42. And, if the located service provider 12, 14 or 16 is classified as a home service provider or a partner service provider the mobile station 24 will camp on the read and identified channel 28, 30 or 32. If the read and identified channel 28, 30 or 32 corresponds with a favored service provider or a neutral service provider, the mobile station 24 will store the channel information in temporary memory 48 (FIG. 2) and return the stored channel information if no "better channels" are eventually located. Finally, if the read and identified channel 28, 30 or 32 is associated with a forbidden service provider, then the mobile station 24 will continue to repeat the current intelligent roaming procedure and not store the channel information corresponding with the read and identified channel.

Referring again to FIG. 3 and the improved intelligent roaming procedure 100, if the processor 44 locates a channel that does not have a corresponding stored identifier code 40 in the IRDB 38 then the intelligent roaming procedure treats the best service provider as a neutral service provider, as illustrated by stage 108.

At stage 110, channel information associated with the located channel 28, 30 or 32 having a set overlap flag 42 is stored in the temporary memory 48 located within the mobile station 24. The channel information includes frequency data and classification data corresponding to one of the service providers 12, 14 or 16. The mobile station 24 will then function as if it never detected any RSSI on the located channel 28, 30 or 32.

At stage 112, the mobile station 24 will then attempt to locate a subsequent channel 28, 30 or 32 having a SID or SOC that corresponds to one of the stored identifier codes 40. The subsequent channel 28, 30 or 32 is broadcasted from one of the service providers 12, 14 or 16.

Figure 5:
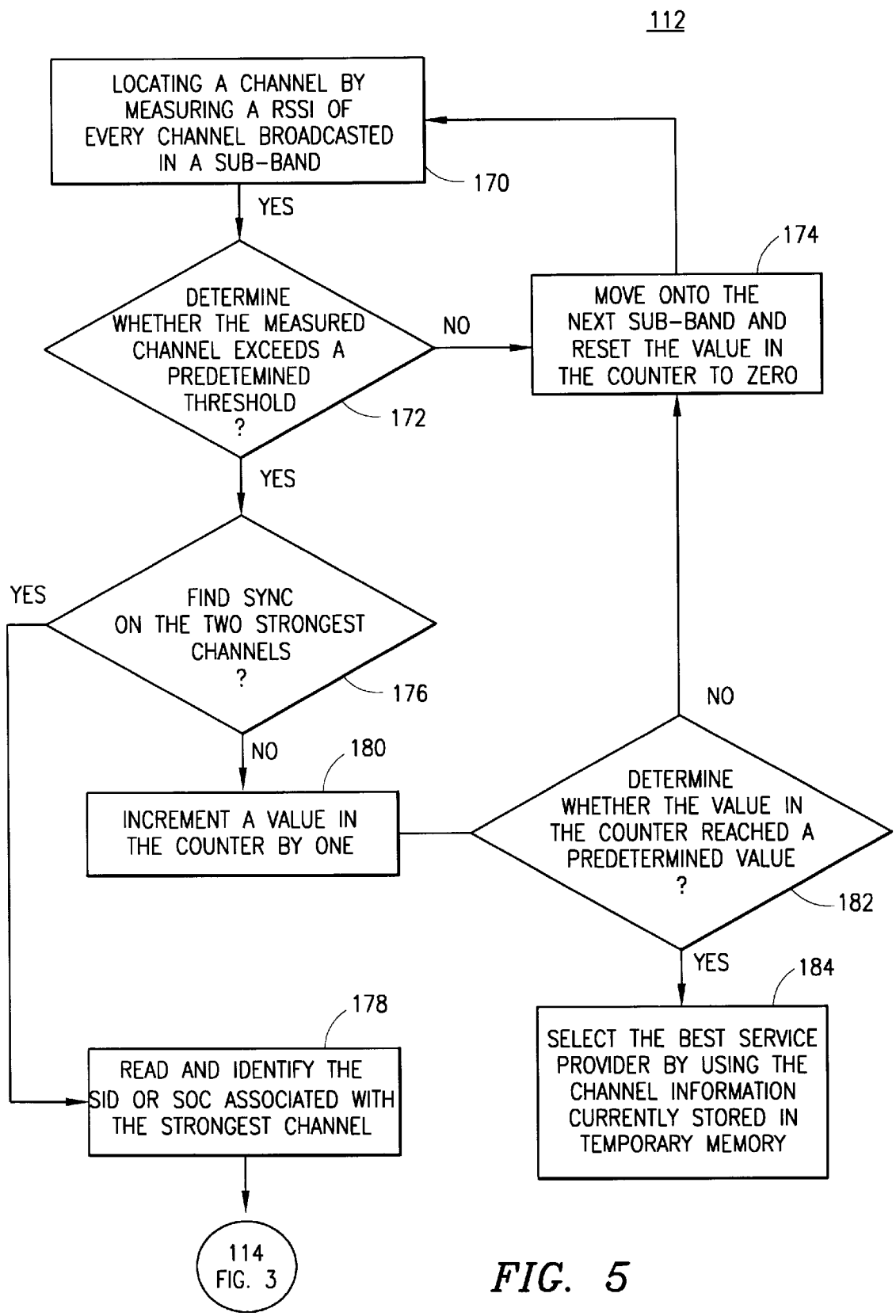
FIG. 5 is a simplified flow diagram of a step of locating a subsequent channel associated with stage 112 of FIG. 3.

Referring to FIG. 5, there is illustrated a simplified flow diagram of the step of locating a subsequent channel associated with stage 112 of FIG. 3. In performing stage 170, mobile station 24 locates one of the channels 28, 30 and 32 by measuring a received signal strength (RSSI) of every channel broadcasted in one of the sub-bands.

At stage 172, the mobile station 24 determines whether the measured RSSI exceeds a predetermined magnitude. If no, the mobile station 24 will move onto the next sub-band at stage 174 and repeat the step of measuring a RSSI (stage 170). Otherwise at stage 176, the mobile station 24 attempts to find sync on the two strongest channels. If the mobile station 24 is not able to find sync then at stage 180 a counter is incremented by one. At stage 182, the mobile station 24 will determine whether the value in the counter has reached a predetermined value. If yes, then the channel information currently stored in the temporary memory 48 is used by the processor 44 to select the best service provider, as illustrated at stage 184. Otherwise, the mobile station 24 moves onto the next sub-band (stage 174) and the counter associated with sync is reset to zero. In addition, if sync is found at stage 176 then the mobile station 24 reads and identifies the SID or SOC associated with a strongest channel at stage 178. Thereafter, the intelligent roaming procedure 100 continues to stage 114 (FIG. 3).

Referring again to FIG. 3 and specifically to stage 114, the processor 44 evaluates and compares channel information associated with the subsequent located control channel 28, 30 or 32 to that of the channel information currently stored in the temporary memory 48 to select a best channel.

At stage 116, the processor 44 determines if the best channel is the subsequent located control channel 28, 30, or 32. If the answer is an affirmative then reference is made to stage 118, where the channel information currently stored in temporary memory 48 is replaced with the channel information associated with the subsequent located channel 28, 30 or 32. Otherwise, the channel information currently stored in the temporary memory 48 remains intact.

At stage 120, the processor 44 determines whether the overlap flag 42 associated with the subsequent located channel 28, 30 or 32 was set. If no, stage 122 is commenced and the channel information last stored in temporary memory 48 is restored and utilized by the mobile station 24 to select the best service provider. If yes, then stage 124 is commenced and the overlap counter 50 is incremented by one.

At stage 126, the processor 44 determines whether the incremented value in the overlap counter 50 exceeds a predetermined threshold. If yes, the intelligent roaming procedure 100 returns to and selects the best service provider in accordance with the restoring step of stage 122. Otherwise, the intelligent roaming procedure 100 locates another subsequent channel 28, 30 or 32 according to stage 112 and continues to proceed until selection of the best service provider is completed in the restoring and selecting steps associated with stage 122.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An intelligent roaming method for enabling a mobile station to select a best service provider from a plurality of service providers, said mobile station having a database for storing a plurality of identifier codes corresponding with the plurality of service providers, said intelligent roaming method comprising the steps of:

locating a first channel and a second channel transmitted by a first service provider and a second service provider respectively based upon signal strength measurements, each channel containing one of the stored identifier codes;

evaluating channel information associated with the first channel and channel information associated with the second channel to select a channel for supporting a call;

determining a status of an overlap flag associated with the stored identifier codes of the first channel and the second channel, the overlap flag indicating whether the mobile station is located on an edge of a coverage area of one of the service providers; and selecting a service provider based upon the status of the overlap flags and the selected channel.

2. The method of claim 1, wherein the step of evaluating channel information includes a step of evaluating frequency data and classification data associated with one of the plurality of service providers.

3. The method of claim 1, further comprising a step of classifying the service provider into at least one of the following classifications including a home service provider, a partner service provider, a favored service provider, a neutral service provider, and a forbidden service provider.

4. The method of claim 1, wherein the step of selecting the service provider includes a step of selecting the service provider based on a value of an overlap counter.

5. The method of claim 1, further comprising a step of storing channel information associated with the channel when the overlap flag has been set, said channel information stored in temporary memory.

6. The method of claim 1, further comprising the steps of:

locating a subsequent channel transmitted by a subsequent service provider, said subsequent channel containing one of the stored identifier codes;

evaluating channel information associated with the subsequent channel and the evaluated channel information to select the best channel;

determining the status of the overlap flag associated with the stored identifier code of the subsequent channel; and repeating the steps of locating, evaluating, and determining if a predetermined value exceeds an incremented value in an overlap counter.

7. An intelligent roaming method for enabling a mobile station to select a best service provider from a plurality of service providers, said intelligent roaming method comprising the steps of:

locating a channel having one of the identifier codes, said channel transmitted by one of the plurality of service providers;

storing channel information associated with the located channel when the overlap flag has been set, said channel information stored in temporary memory;

locating a subsequent channel having one of the identifier codes, said subsequent channel broadcasted from a second of the plurality of service providers;

evaluating channel information associated with the located subsequent channel and said channel information currently stored in the temporary memory to select a channel;

replacing the channel information currently stored in the temporary memory with the channel information associated with the located subsequent channel if the selected channel is the located subsequent channel;

determining a state of an overlap flag associated with an identifier code of the subsequent channel; and selecting the best service provider based upon the status of the overlap flag and the stored channel information.

8. The method of claim 7, wherein the step of evaluating channel information includes a step of evaluating frequency data and classification data associated with one of the plurality of service providers.

9. The method of claim 7, further comprising a step of classifying the best service provider into at least one of the following classifications including a home service provider, a partner service provider, a favored service provider, a neutral service provider, and a forbidden service provider.

10. The method of claim 7, wherein the step of selecting the best service provider includes a step of selecting the best service provider based on a value of an overlap counter.

11. The method of claim 7, wherein the step of locating a channel includes measuring a signal strength of the channel, and switching to another sub-band if the measured signal strength does not exceed a predetermined magnitude.

12. A method for selecting a service provider from a plurality of service providers for utilization by a mobile station having a database, said method comprising the steps of:

storing a plurality of identifier codes in the database, said plurality of identifier codes corresponding with the plurality of service providers;

adding an overlap flag to each of the stored identifier codes, where the overlap flag indicates whether the mobile station is located on an edge of a coverage area of one of the service providers;

locating a channel having one of the identifier codes, said channel broadcasted from a first of the plurality of service providers;

storing channel information associated with the located channel when the overlap flag has been set, said channel information stored in temporary memory;

locating a subsequent channel having one of the identifier codes, said subsequent channel broadcasted from a second of the plurality of service providers;

evaluating channel information associated with the located subsequent channel and said channel information currently stored in the temporary memory to select a channel;

replacing the channel information currently stored in the temporary memory with the channel information associated with the located subsequent channel if the selected channel is the located subsequent channel;

restoring the channel information last stored in the temporary memory; and selecting the service provider by utilizing the restored channel information.

13. The method of claim 12, further comprising a step of repeating a predetermined number of times the steps of locating a subsequent channel, evaluating channel information, and replacing the channel information.

14. The method of claim 12, wherein the step of evaluating channel information includes a step of evaluating frequency data and classification data associated with the located subsequent channel.

15. The method of claim 12, further comprising a step of classifying the selected service provider into at least one of the following classifications including a home service provider, a partner service provider, a favored service provider, a neutral service provider, and a forbidden service provider.

16. The method of claim 12, wherein the step of selecting the service provider includes the step of selecting the service provider based on a value of an overlap counter.

17. The method of claim 12, wherein the step of locating a channel includes the steps of:

measuring a signal strength of the channel; and switching to a subsequent sub-band if the measured signal strength does not exceed a predetermined magnitude.

18. The method of claim 17, wherein the step of locating a channel further includes the steps of:

switching to the subsequent sub-band if the mobile station can not find sync within a present sub-band; and incrementing a counter by one if the mobile station switched to the subsequent sub-band.

19. The method of claim 12, further comprising the steps of:

determining whether the overlap flag had been set in the located subsequent channel; and incrementing a value in an overlap counter by one if the overlap flag had been set.

20. The method of claim 19, further comprising the steps of:

comparing the incremented value in the overlap counter to a predetermined value; and repeating a predetermined number of times the steps of locating a subsequent channel, evaluating channel information, and replacing the channel information if the predetermined value exceeds the incremented value in the overlap counter.

21. A mobile station comprising:

a database for storing a plurality of identifier codes associated with a plurality of service providers, each identifier code having an overlap flag for indicating whether the mobile station is located on an edge of a coverage area of one of the service providers;

a receiver for locating transmitted channels having one of the identifier codes from one of the plurality of service providers;

a temporary memory for storing channel information associated with the located channels; and a processor for evaluating channel information associated with the located channels stored in the temporary memory to select a channel for supporting a call based upon a status of the overlap flags.

22. The mobile station of claim 21, wherein said processor further includes means for measuring a received signal strength of at least one of said transmitted channels.

23. The mobile station of claim 21, further including an overlap counter for determining a maximum number of the channels to be located.

24. The mobile station of claim 21, further including a counter for determining a maximum number of sub-bands to be scanned.

* * * * *